C. WADHAMS.
Improvement in Machines for Crushing and Stemming Grapes.
No. 131,316. Patented Sep. 10, 1872.
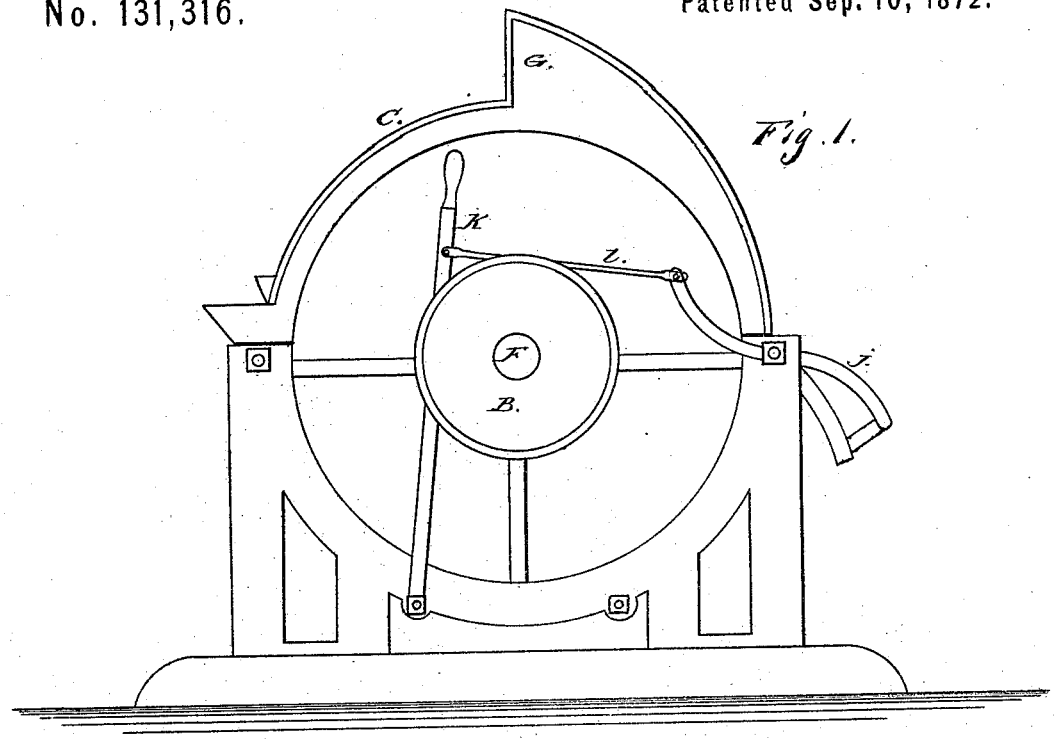
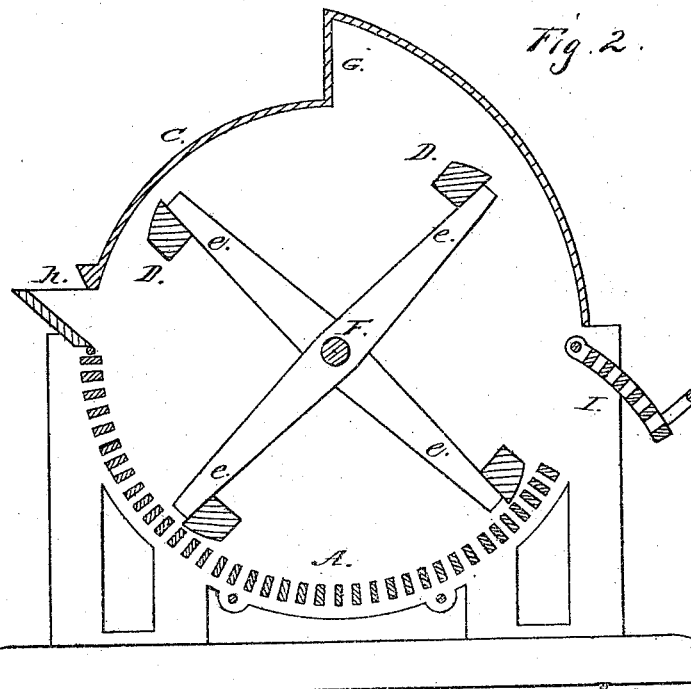
Witnesses
J. L. Boone
C. M. Richardson
Inventor
Collins Wadhams
per Dewey & Co
Attys

UNITED STATES PATENT OFFICE.

COLLINS WADHAMS, OF LOS ANGELES, CALIFORNIA.

IMPROVEMENT IN MACHINES FOR CRUSHING AND STEMMING GRAPES.

Specification forming part of Letters Patent No. 131,316, dated September 10, 1872.

*To all whom it may concern:*

Be it known that I, C. WADHAMS, of Los Angeles, Los Angeles county, State of California, have invented an Improved Machine for Crushing and Stemming Grapes; and I do hereby declare the following description and accompanying drawing are sufficient to enable any person skilled in the art or science to which it most nearly appertains to make and use my said invention or improvements without further invention or experiment.

My invention relates to a machine for crushing and stemming grapes preparatory to wine making. The lower half of my machine consists of a concave or semicircular trough, which is made of slats placed closely together. This concave or trough is covered by a semicircular top.

The grapes are crushed and stemmed inside of the concave by revolving strips or beaters, which are so constructed as to rub the grapes over the slatted surface and thus reduce them to a pulp, so that the entire grape will pass between the slats and leave the stems inside of the machine, from which they are instantaneously removed in the manner hereinafter described.

In order to explain my invention so that others will be able to understand its construction and operation, reference is had to the accompanying drawing forming a part of this specification, in which—

Figure 1 is an end view of the crusher and stemmer. Fig. 2 is an end sectional view of same.

A represents a semicircular trough or concave. This trough is made of numerous slats or strips of wood or other suitable material, which are secured to the solid ends B so that a small space will be left between each two slats. These spaces should not be sufficient to allow the grapes to pass through before being crushed. A semicircular cover, C, is made to fit over the concave or trough A to prevent the grapes and stems from being thrown out by the action of the revolving beaters. The beaters D are carried at the ends of arms e, which radiate from a shaft, F. This shaft bears in boxes on the ends B B and is revolved by any suitable power. The arms e are of the proper length to cause the beaters to pass close to the slats on the inner surface of the concave, and in order to regulate this space the boxes in which the shaft F revolves can be made adjustable. The outer faces of the beaters which pass next to the slats are rounded eccentrically to the shaft upon which they are fixed, thus throwing one edge nearer to the slats than the other while they are passing around the concave; and they are revolved in the proper direction to cause this space to be in advance of the edge which is nearest the slats. This causes the grapes to be caught in the space and rolled against the slats with a rubbing movement, which not only crushes them but thoroughly breaks up the interior cells of the grapes, and the following edge presses the crushed grapes through the slats, leaving the stems in the box. One half of the cover C is made upon a larger circle than the other half, as shown, and the edges of the two halves are joined by a vertical strip so as to form a shoulder, G, directly above the shaft F, and as the beaters revolve in the smaller circle a space is left at the top of the machine of the form shown. The centrifugal force of the beaters will have a tendency to cause some of the grapes and pulp to be carried around the interior of the machine, but this space at the top allows any such to be thrown off from the beaters against the shoulder G, from whence they fall back to the lower part of the concave, to be again subjected to the rubbing process. An opening, $h$, is left at one side of the cover C, through which the grapes are fed into the machine, by hand or otherwise, in bunches, just as they are picked from the vine. A narrow portion, I, of the concave is hinged or otherwise loosely attached to the ends B, and can be thrown open by a lever, $j$, which is operated by the person who feeds the machine by means of a hand-lever, K, which is connected with the lever $j$ by a connecting-rod, $l$. After a quantity of grapes has been fed into the machine the operator can, by means of the lever K, throw open the door or section I and permit the revolving arms to hurl the accumulated stems out of the machine.

With this machine the grapes can be thoroughly crushed and separated from the stems, and the resulting mash will be in fit condition to be pressed for the purpose of extracting the juice for making wine.

I do not confine myself to any particular form of beaters, nor to any particular arrangement of the slat-concave. I am aware that a slat-concave has heretofore been used in combination with vibrating beaters, and this I do not claim; but What I do claim, and desire to secure by Letters Patent, is—

1. The combination of revolving beaters or rubbers D, having their outer faces curved eccentrically to the shaft, with a slat-concave, A, and cover C, substantially as and for the purpose above described.

2. The slat-concave A, with its hinged section I, in combination with the lever $j$, hand-lever K, and connecting-rod $l$, substantially as and for the purpose above described.

3. In combination with the slat-concave A I claim the cover C, provided with the offset and shoulder G, substantially as and for the purpose above specified.

In witness whereof I hereunto set my hand and seal.

COLLINS WADHAMS. [L. S.]

Witnesses:
JOHN L. BOONE,
C. M. RICHARDSON.